United States Patent
Waters et al.

(10) Patent No.: US 11,206,862 B2
(45) Date of Patent: Dec. 28, 2021

(54) TWO STAGED TOOTHED ROLLER APPARATUS FOR INCREASED RECOVERY OF OIL FROM LEMONS AND OTHER CITRUS FRUIT USING DESPORPTION

(71) Applicant: Brown International Corporation, LLC, Winter Haven, FL (US)

(72) Inventors: Roger Waters, Auburndale, FL (US); Carlos Valentin Gallo, Tafi Viejo (AR); Santiago Manuel Sosa, Tafi Viejo (AR); Victor Francisco Onchi Navarro, Davenport, FL (US)

(*) Notice: Subject to any disclaimer, the term of this patent is extended or adjusted under 35 U.S.C. 154(b) by 226 days.

(21) Appl. No.: 16/602,548

(22) Filed: Oct. 29, 2019

(65) Prior Publication Data

US 2020/0060327 A1 Feb. 27, 2020

Related U.S. Application Data

(62) Division of application No. 15/731,651, filed on Jul. 12, 2017, now Pat. No. 10,492,520.

(60) Provisional application No. 62/493,950, filed on Jul. 21, 2016.

(51) Int. Cl.
| | | |
|---|---|---|
| A23N 15/06 | (2006.01) | |
| A23L 2/06 | (2006.01) | |
| A23N 1/00 | (2006.01) | |
| A23N 1/02 | (2006.01) | |

(52) U.S. Cl.
CPC ............... *A23N 15/06* (2013.01); *A23L 2/06* (2013.01); *A23N 1/003* (2013.01); *A23N 1/02* (2013.01)

(58) Field of Classification Search
CPC . A23L 2/06; A23L 27/13; A23L 19/07; A23N 1/02; A23N 1/003; A23N 4/18; A23N 15/06; A47J 17/04
USPC .......................................................... 99/496
See application file for complete search history.

(56) References Cited

U.S. PATENT DOCUMENTS

| | | |
|---|---|---|
| 1,814,888 A | 7/1931 | Bennett |
| 2,354,878 A | 8/1944 | Platt |
| 3,707,176 A | 12/1972 | Bushman |
| 3,954,032 A | 5/1976 | Holbrook |
| 4,070,959 A | 1/1978 | Bushman et al. |

(Continued)

OTHER PUBLICATIONS

IPEA/US International Preliminary Examination Report, Jan. 31, 2019 (PCT/US2017/000038).

(Continued)

*Primary Examiner* — Ibrahime A Abraham
*Assistant Examiner* — Spencer H. Kirkwood
(74) *Attorney, Agent, or Firm* — Jones Day

(57) ABSTRACT

A two stage system for extraction of oil from whole citrus fruit is provided. The first stage is known in the art and includes a first plurality of toothed rollers which convey citrus as the teeth penetrate and rupture oil glands. The oil passes into a first water pan. A novel second stage uses a second plurality of toothed rollers to continue the penetration and rupturing of oil glands. The second plurality of rollers are positioned in an isolated second pan to partially submerge the citrus. A middle phase liquor with extremely low oil concentration is transferred into said second pan to initiate desorption of oil from the citrus. The desorption technique in one embodiment increases yield by 4% or more. This technique is expected to increase yield even more as the recovery by the first stage is reduced.

7 Claims, 4 Drawing Sheets

(56) References Cited

U.S. PATENT DOCUMENTS

| | | | | |
|---|---|---|---|---|
| 4,248,142 A | * | 2/1981 | McKinney, Jr. ....... | A23N 1/003 198/531 |
| 4,470,344 A | * | 9/1984 | Bushman ............... | A23N 1/003 99/509 |
| 6,994,018 B2 | | 2/2006 | Bushman et al. | |
| 2003/0213379 A1 | | 11/2003 | Augusto et al. | |

OTHER PUBLICATIONS

India Patent Application 201827047395, First Examination Report, dated May 31, 2021.

* cited by examiner

TWO STAGED TOOTHED ROLLER APPARATUS FOR INCREASED RECOVERY OF OIL FROM LEMONS AND OTHER CITRUS FRUIT USING DESPORPTION

CROSS REFERENCE TO PENDING APPLICATIONS

This application claims the benefit of and priority from United States provisional applications Ser. Nos. 62.493,950 filed Jul. 21, 2016 and 62/602,357 filed Apr. 19, 2017. This application is a divisional of and claims priority from application Ser. No. 15/731,657 filed Jul. 12, 2017.

BRIEF BACKGROUND

The worldwide demand for citrus oil, used in a wide and expanding number of products, continues to rise. There is a large demand for increasing the percentage of oil recovered from lemons and other citrus fruits. There is also a rising demand to increase the throughput capacity of oil extraction equipment. The oil extraction systems discussed herein typically process over 10 metric tons of citrus per hour. Any increase in the percentage of citrus oil extracted not only increases profitability, but also has the environmental advantage of reducing the handling and treatment of oil which is not extracted. It is also important to minimize the amount of water utilized in the oil extraction process. A further problem in either increasing the percentage of oil extracted or increasing throughput capacity is to avoid increasing the footprint of the equipment. By avoiding an increased footprint, the expense and down time of installing new equipment are minimized. A related demand is that the new equipment be capable of being retrofitted to existing equipment.

DETAILED BACKGROUND

The extraction of citrus oils from whole intact fruit is known and is disclosed in U.S. Pat. Nos. 3,954,032; 4,070,959; 6,994,018 (all of which are incorporated herein by reference) in which the extractor includes parallel horizontal toothed rolls submerged underwater and running at differential speeds to penetrate the oil glands in the fruit and cause release of oil into a pan of water. In particular U.S. Pat. No. 6,994,018 is an improved citrus oil extractor in which each roll is driven independently with a separate motor in which each motor speed is controlled using a variable frequency drive (VFD) programmed to control motors based on parameters including the type of fruit to be processed. This drive mechanism allows variation in the speed at which citrus passes through the extractor.

The prior art includes an oil extraction process (shown in FIG. 2 and referred to herein and in the claims as the "closest known prior art"), in which the oil/water mixture leaving the oil extractor, along with rinse water from drying rolls, passes through a straining device, such as a paddle finisher or parabolic static screen to remove large debris such as broken fruit pieces or other debris from the fruit, and then into a first stage centrifuge separator. The first stage separator functions to remove insoluble solids (bowl discharge) and to enrich the oil/water emulsion (light phase) to a final concentration which is typically 80 to 90% oil by weight (middle phase). The enriched emulsion is further processed through a clarifying type centrifuge (polisher) to separate remaining insoluble solids and water from the oil. In some cases, such as in the recovery of lemon oil and other valuable oils, a second stage separator may be set up between and in series with the first stage and polisher centrifuges. With the two stage separator configuration the back pressure on the middle phase is adjusted to produce an emulsion with a concentration level between 65 and 70% oil in water. This practice is believed to increase overall centrifuge efficiency and reduce oil losses as compared to just a single stage separator. The aqueous phase, which is the bulk of water used in the process and often referred to as the heavy or middle phase from the first stage separator centrifuge, is returned to the oil extractor primarily for the purpose of water conservation and reduced waste disposal. Typically, as in the case of lemon oil recovery processes, 90 to 95% of the water is returned to the extractor from the centrifuges whereas 5% to 10% of the water is either carried out with the fruit or discharged out the first stage separator along with the sludge and emulsion streams. The recirculation of the middle phase to the extractor has an additional advantage of preserving some of the valuable flavor components of the oil, in particular lemon oil, which would otherwise be partially soluble in the water resulting in loss of the components. Circulation rate to the first stage separator centrifuge and back to the extractor is typically adjusted to achieve a concentration of oil in water from the centrifuge typically ranging from 0.5 to 2.0% by weight whereas the preferred concentration is typically 0.8 to 1.1% by weight. The middle phase stream from the first stage separator centrifuge, which typically has a residual oil content of 0.05% to 0.2% oil by weight, is returned to the extractor in order to reduce overall water usage in the process and preserve water soluble components. The middle phase is returned to the bottom of the extractor pan at the fruit discharge end of the extractor and flows toward the fruit inlet end of the extractor and over a weir which maintains a constant level of liquid near the top of the rolls. With this arrangement of continuous fluid flow to the extractor, the oil/water liquid, commonly referred to as oil liquor, increases in oil content as it transverses the extractor whereas the oil in the fruit is being continuously depleted as it passes across each subsequent group of rolls. It is known to those skilled in the art that such a counter-current flow of liquid to the fruit flow, in theory, is best for minimizing re-adsorption of oil into the peel of the fruit.

With the prior art extraction system, the amount of oil that can be removed from the fruit depends on a number of factors which includes, but not limited to, roll speeds both axial and radial, fruit retention time, water temperature, oil concentration in contact with the fruit and available centrifuge capacity. Other variables affecting oil removal include fruit variety, maturity, size, shape, softness, and unusual surface aberrations such as those caused by disease.

With respect to increasing fruit retention time across the extractor to increase oil removal, there is generally a point at which the fruit starts to reabsorb oil from the oil liquor in the extractor at a faster rate than is being removed from the fruit. Therefore, with the prior art there is generally a practical limit on the amount of oil that can be removed from the fruit by increasing retention time across the extractor. Increasing retention time beyond a certain point also presents additional problems of increasing particulates in the oil liquor to be centrifuged thus reducing overall centrifuge performance as well as severely weakening the peel of the fruit having a significant impact on the extraction of juice from the fruit.

Another problem with the closest known prior art to applicants (shown in FIG. 2 and described further below) is with the apparatus and method for removing residual oil on the fruit surface after being discharged from the extractor. It is necessary to remove this oil from the fruit surface so that the oil does not combine with and contaminate juice removed from the fruit in a subsequent process. The fruit immediately after the extractor passes across a bed of smooth stainless steel rolls which is referred to as a "dryer" in which only remaining oil on the surface of the fruit is removed whereas the rolls are not effective in removing absorbed oil (i.e. oil below the surface of the fruit). The effectiveness of the dryer table in recovering surface residual oil is further reduced due to problems in distributing low volumes of rinse water though nozzles uniformly to the relatively large cross section of fruit being discharged from the extractor and short retention time of fruit below the fresh water rinse nozzles. The prior art "dryer" recovers only about 0.5% of the original oil in the citrus regardless of the variables. Increasing the fresh water rinse to fruit on the dryer table presents another problem in that the increase of volume to the system which then will require bleeding off a portion of the middle phase return to the drain, causing both the potential loss of valuable oil and an environmental impact of increasing wastewater. An additional problem is that the fruit, especially lemons, tend to move across the rolls with only the center part of lemon contacting the rolls and therefore residual oil/water on the ends of the lemon is not effectively transferred to the rolls. An additional problem with the dryer is that contact of the wipers on the bottom of the rolls is only partially effective due to wear and other factors which can result in ineffective removal of surface liquid from the rolls.

In addition to the challenges of increasing oil removal by increasing retention time across the extractor and the challenge of reducing residual oil in the fruit, of a particular challenge is the efficient removal of oil from lemons and other non-spherical fruits. Efficient removal of oil from lemons in particular is a challenge due to the elongated shape and especially due to the protruding tips at the stem and stylar ends of the fruit. Typically, peak oil recovery is achieved by slowing down the fruit rate across the extractor to a rate of 11 to 12 metric tons per hour to achieve a retention time of lemons of approximately 60 seconds. At this rate, along with programmed roll speeds, the maximum oil removal achieved for lemon is typically 87 to 91% leaving a residual oil content in the fruit of approximately 0.085% of the fruit weight (0.85 kg/mt), or 9% to 13% of the original oil.

Oil removals are further reduced at a given fruit rate with lemons harvested near the end of a processing season when fruit tends to get softer. Typically, during the late part of the season, the fruit rate across the extractor needs to be further slowed down in order to maintain high oil removals. Further reduction of oil removal occurs with fruit conditions which tend to produce very hard, green, and bumpy surface such as occasionally seen in lemons affected by Botrytis (a citrus disease). Under such conditions, as that resulting from Botrytis infection, slowing down the fruit rate across the extractor has been only partially effective in increasing the oil removal and is generally not a desirable solution due to the effect of reducing overall throughput of fruit and decreasing oil and juice production.

As fruit moves across the prior art extractor, the peel surface becomes increasingly spongy due to the knives penetrating and rupturing oil glands and thus increases tendency to reabsorb oil. As mentioned above the reabsorption can limit the maximum oil removal which can be achieved. In order to reduce the amount of oil reabsorbed, it is generally known by those skilled in the art, that the amount of oil reabsorbed can be reduced by operating centrifuges at flow rates and efficiencies to maintain relatively low concentrations of oil in the extractor at any given time. Typically, it has been found that best efficiencies in oil recovery and oil quality has been achieved in maintaining an oil concentration of liquor discharge from the extractor at 0.8% to 1.1%. Lower concentrations can lead to loss of some of the volatile flavor components of the oil whereas higher concentrations can increase loss of oil due to reabsorption into the peel and carry out with the fruit. In addition to maintaining a low oil concentration, it is also known in the art that a flow of the liquor through the extractor countercurrent to the direction of fruit flow is most desirable to reduce reabsorption of oil into the fruit in that the liquor in contact with the fruit should be the lowest where the fruit has been mostly depleted of oil and the peel becomes spongy. This is especially true for fruits such as grapefruit and lemon which have very high value oil and are therefore processed at relatively low rates across the extractor to achieve maximum oil removal. In the case of lemons, slowing down the fruit rate is effective only to a certain point, and oil removal typically reaches a plateau of 87 to 91% removal which is thought to be due to the oil reabsorption phenomenon. It has been discovered through sampling of oil liquor in various areas of the prior art extractor, during steady state operation, that the oil concentration in contact with the fruit on the last 25% of the rolls in the extractor, prior to exiting the extractor, is approximately 3.0 times higher in oil concentration than the oil concentration in the return from the centrifuge. It was further found that the liquor closest to the roll surface, where oil is extracted from the fruit, had an oil concentration averaging approximately 1.1 times higher than the liquor at the bottom of the pan due to tendency of oil to float.

BRIEF SUMMARY OF THE INVENTION

The present invention responds to and satisfies the above demands for increased recovery percentage and increased throughput capacity. The present invention provides a two stage oil extraction system. The first stage, or primary extraction system is known in the prior art, and uses a first set of toothed rollers to penetrate and rupture oil glands in the peel and cause oil to drop or pass into a first pan of water to form an oil and water emulsion. The second stage, or secondary extraction system, is novel. The secondary extraction system may be utilized in one embodiment to increase oil recovery over the closest known prior art (shown in FIG. 2) by increasing retention time of the citrus to increase oil extraction by 4%, a very significant amount in the produce and food industry. Alternately, we believe the secondary oil extraction system may be utilized to increase throughput capacity by 20% or more while extracting the same percentage of oil as the closest known prior art. A further option is to combine a smaller increase in retention time with a smaller increase in throughput capacity.

We have also found that the novel secondary extraction system will prove to be more effective in those situations where the primary extraction recovers less than the 87%-91% described above. We believe that when the primary extraction drops to 70%, the secondary extraction will increase significantly. For example, the 87% to 91% recovery by the known primary extraction is obtainable with healthy, mid-season lemons. Significantly lower primary recovery occurs with oranges, grapefruit, and with early or late season citrus; as noted above, other variables include fruit maturity, size, shape, softness and surface aberrations. The prior art dryer is inherently limited to recovering about 0.5% or less of the original oil from all citrus, regardless of variables. As stated below, we believe that as primary extraction drops to 70% recovery because of these variables, the novel secondary recovery will increase to 10% or more of the original oil, an enormous increase in recovery over the prior art secondary recovery of 0.5%.

The key aspect of the secondary oil extraction system (shown and described in detail below) is to transfer the citrus, after primary oil extraction, to a second set of toothed rollers in a second pan. Water which is used in the primary oil extraction, and from which almost all oil has been removed (by centrifuge, typically) is introduced into the second pan. In the second pan, the citrus has a higher remaining concentration of oil than the nearly oil free, centrifuged water (also referred to as "middle phase liquor" herein). The citrus is partially submerged in the centrifuged water to cause desorption of oil from the citrus, because the citrus still has a higher concentration of oil than the centrifuged water. In a preferred embodiment of the invention, the water being discharged from the second pan with the desorbed oil is transferred to the first pan, in which case the desorbed oil combines with oil in the emulsion in the first pan, and is then transferred to a centrifuge or other separator for recovery of the oil. Using the desorption phenomenon in this manner enables either an increased percentage recovery of oil of 4%, or a potential increased throughput capacity of 20% or more while recovering the same percentage of oil, or an intermediate combination of both.

The secondary extraction system eliminates the need for a drying system, avoids increasing the footprint of the oil extraction system, and also allows retrofitting the novel secondary extraction system into conjunction with an existing primary oil extraction system.

A primary object of the invention is to provide an improved, two stage citrus oil extraction system capable of recovering at least 4% more oil than the closest known prior art.

Another primary object of the invention is to provide an improved, two stage citrus oil extraction system capable of increasing throughput capacity of 20% or more, while also extracting the same percentage of oil as the closest known prior art.

A further object is to provide an improved, two stage citrus oil extraction system which combines a smaller increase in recovery than 4% with an increase in throughput capacity less than 20%.

A further object is to provide an improved, two stage citrus oil extraction system wherein where the primary extraction recovers less oil because of variables noted above, the novel secondary extraction system recovers more oil, in some cases recovering more than 10% and perhaps more of the original oil.

A further object is to eliminate the need for a dryer required by the closest known prior art, which in turn allows the improved system to be retrofitted for use with a portion of the closest known prior art.

Another object is to provide an improved system which does not increase the footprint of the closest known prior art.

Further objects and advantages will become apparent from the following description and drawings.

DETAILED DESCRIPTION OF THE DRAWINGS

Figure 1:
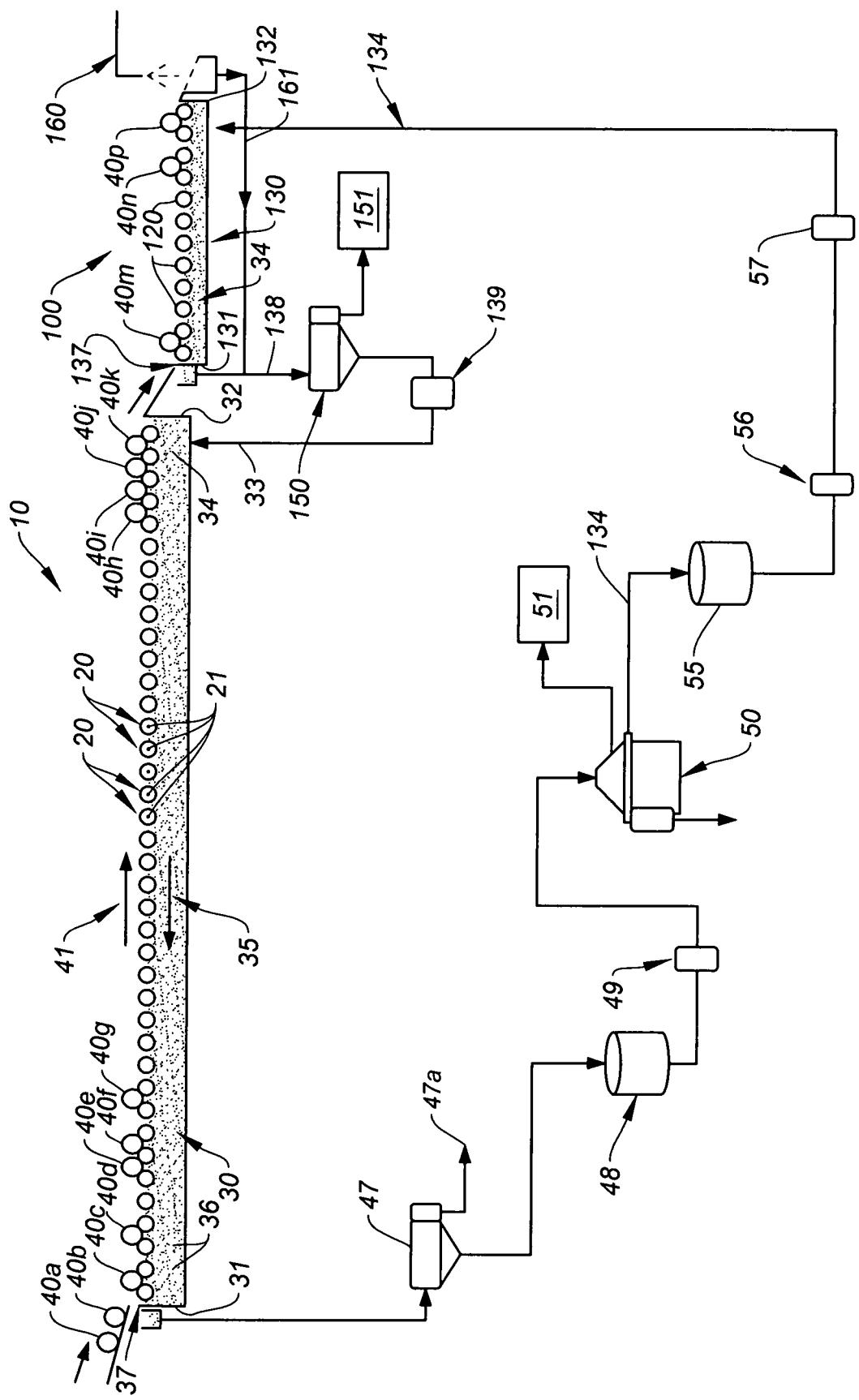
FIG. 1 is a schematic illustration of the preferred embodiment of the invention.

FIG. 1 illustrates the present invention, shown generally as 10. A first plurality of toothed rollers 20 is positioned above first pan 30. The rollers are horizontal, generally parallel and rotate about generally parallel axes 21. The toothed rollers are driven by means known in the art and have projections known in the art which penetrate the peel, and penetrate and rupture oil glands in the peel.

Whole citrus fruit such as lemons 40*a*-40*p* are fed onto toothed rollers 20 at first end 31 of pan 30 and conveyed by rollers 20 in the direction of arrow 41 across pan 30 to second end 32 of pan 30. It is to be understood that only a small number of citrus is shown in FIG. 1 for clarity. Normally, in operation, all rollers are covered with citrus. Toothed rollers 20 have projections (not shown in FIG. 1 for clarity) which penetrate and rupture the oil glands and the peel of the citrus fruit to cause oil to drain downwardly into and is collected in pan 30. Pan 30 is filled with centrifuged water 34 through water input line 33. Rollers 20 are preferably submerged in water to cause the citrus to be partially submerged in water 34. Water 34 is caused to move by displacement of incoming water 33 for example in a direction shown by arrow 35, which is counter to the direction 41 of citrus 40*a*-40*k*. The water 34 and oil shown by dots 36 form an emulsion of citrus oil and water which flows over a weir 37 at the first end of pan 30. The emulsion is transported to a paddle finisher 47, or other filtering or screening devices, to remove and discard any large fruit debris 47*a*. The emulsion then flows to a tank 48 and delivered by a pump 49 to a centrifuge 50, which separates the extracted citrus oil 51.

It is significant to note that the first plurality of toothed rollers extracts approximately 87% to 91% of the original oil from the citrus fruit in the case of normal lemons. The citrus items 40*j* and 40*k* have approximately 9% to 13% of their original oil as they reach the second end 32 of pan 30. It is also significant to note that centrifuge 50 removes about 98-99% of the citrus oil in the primary extraction stage, and discharges a middle phase liquor 134 that is water with most preferably a 0.05-0.15% concentration of oil by weight; preferably less than 0.2% and less than 0.55% concentration of oil by weight.

The above items 20-41 comprise the first stage, or primary oil extraction, and is known in the art.

The novel aspect of the invention is the second stage, or secondary oil extraction stage shown generally as 100.

The secondary oil extraction system 100 includes a second plurality of toothed rollers 120 similar to rollers 20. Rollers 120 are driven by means known in the art and are positioned in a second pan 130 which causes citrus items 40*m*, 40*n* and 40*p* to be partially submerged in middle phase liquor 134, which is transferred from centrifuge 50 through buffer tank 55, positive rotary pump 56 and flow meter 57 and enters the second end 132 of pan 130. The liquor 134 is caused to move from the second end 132 of pan 130 to first end 131 in a direction counter to the direction of motion of citrus 40*m*, 40*n* and 40*p* shown by arrow 141. The liquor 134 is caused to move by the displacement of incoming liquor 134. The citrus is transferred from the first plurality of rollers 20 to the second plurality of rollers 120 by means known in the art.

Figure 2:
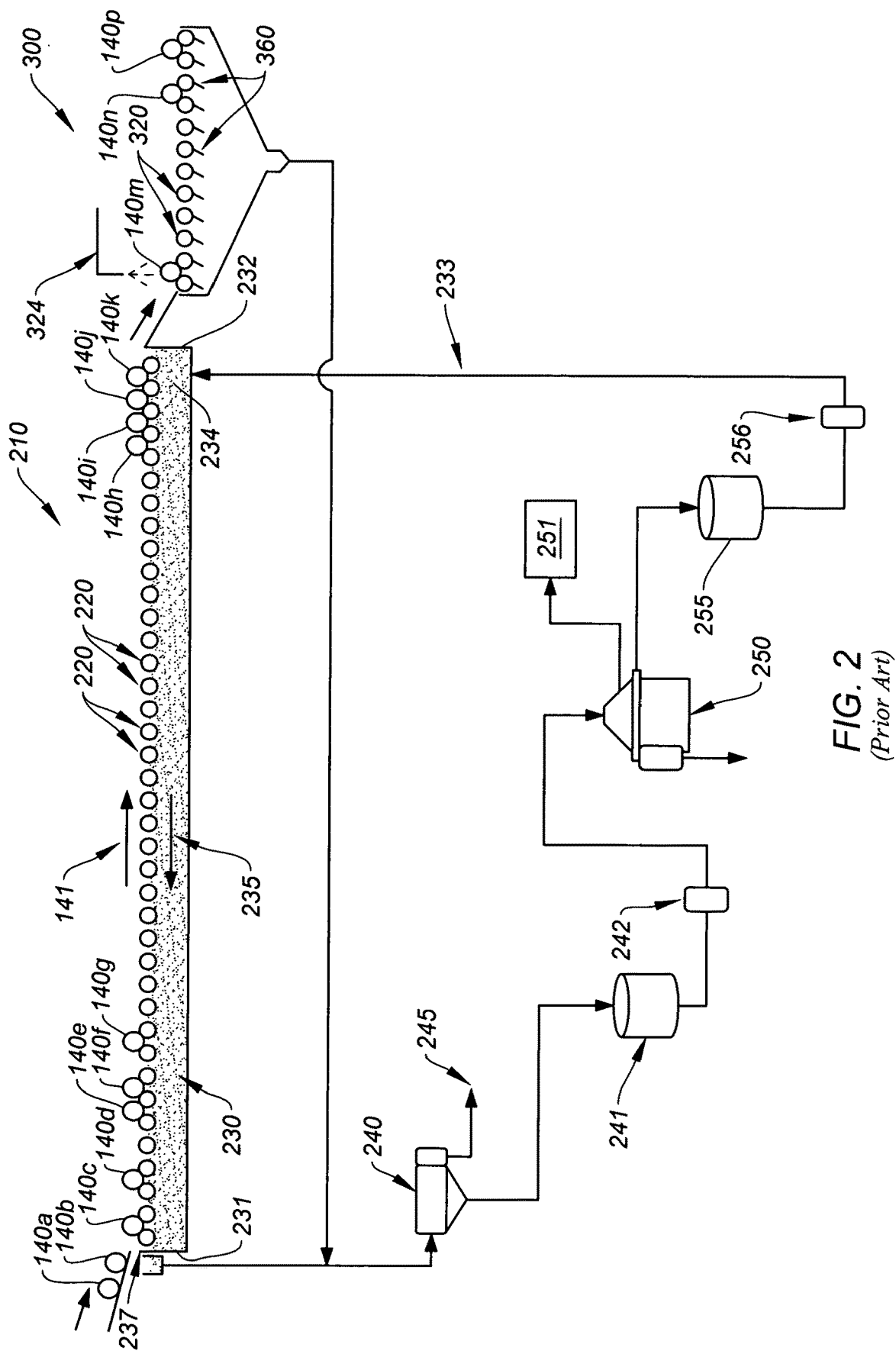
FIG. 2 is a schematic illustration of the closest prior art known to applicants.

As the citrus items 40*m*, 40*n* and 40*p* move across second pan 130, they are partially submerged in liquor 134. Since the liquor 134 has a preferred oil concentration of between 0.05 and 0.15% by weight, and the citrus (in the case of normal lemons) has about 9% to 13% of its original oil remaining, desorption of oil from the citrus into the liquor 134 is initiated. We have found that about one half (or 50%) of the remaining oil or 4.5% to 6.5% of the original oil remaining in the citrus is extracted by the desorption phenomenon, whereas only about 0.5% or less of the original oil remaining in the citrus is recovered by the dryer 300 portion of the closest known prior art (FIG. 2). The present invention in this embodiment accordingly extracts 4% or more oil than the closest known prior art.

We have found that as the amount of oil extracted in the primary extraction decreases, the amount of oil extracted by the novel secondary extraction increases. Although the primary extraction with lemons achieves 87% to 91% extraction of lemon oil, we know from experience that primary extraction of oil from oranges and grapefruit is significantly lower, in the range of 65% to 80%. We expect that the novel secondary extraction system will recover 10% more of the original oil than the closest known prior art when the primary extraction drops to 70% oil recovery. This is a tremendous improvement over the dryer of the closest known prior art, which only recovers about 0.5% or less of original oil, regardless of the type of citrus and condition of the citrus.

It is significant to note that the desorption occurring in pan 130 is "isolated" from the rest of the system. It is isolated in the sense that pan 130 and the second plurality of rollers 120 are isolated, and the middle phase liquor 134, with its extremely low concentration of oil is the only liquid that flows through pan 130 and contacts the citrus to initiate desorption. This "isolation" maximizes the desorption of oil into middle phase liquor 134.

The liquor 134 passes over weir 137 and is transferred through line 138 to a paddle finisher or other straining or filtering device 150 to remove fruit and other debris 151 prior to pump 139 transferring the liquor through line 33 into first pan 30. The oil desorbed into middle phase liquor 134 is ultimately returned through first pan 30 to centrifuge 50 to be separated and recovered. This minimizes the water used in the process.

Figure 3:
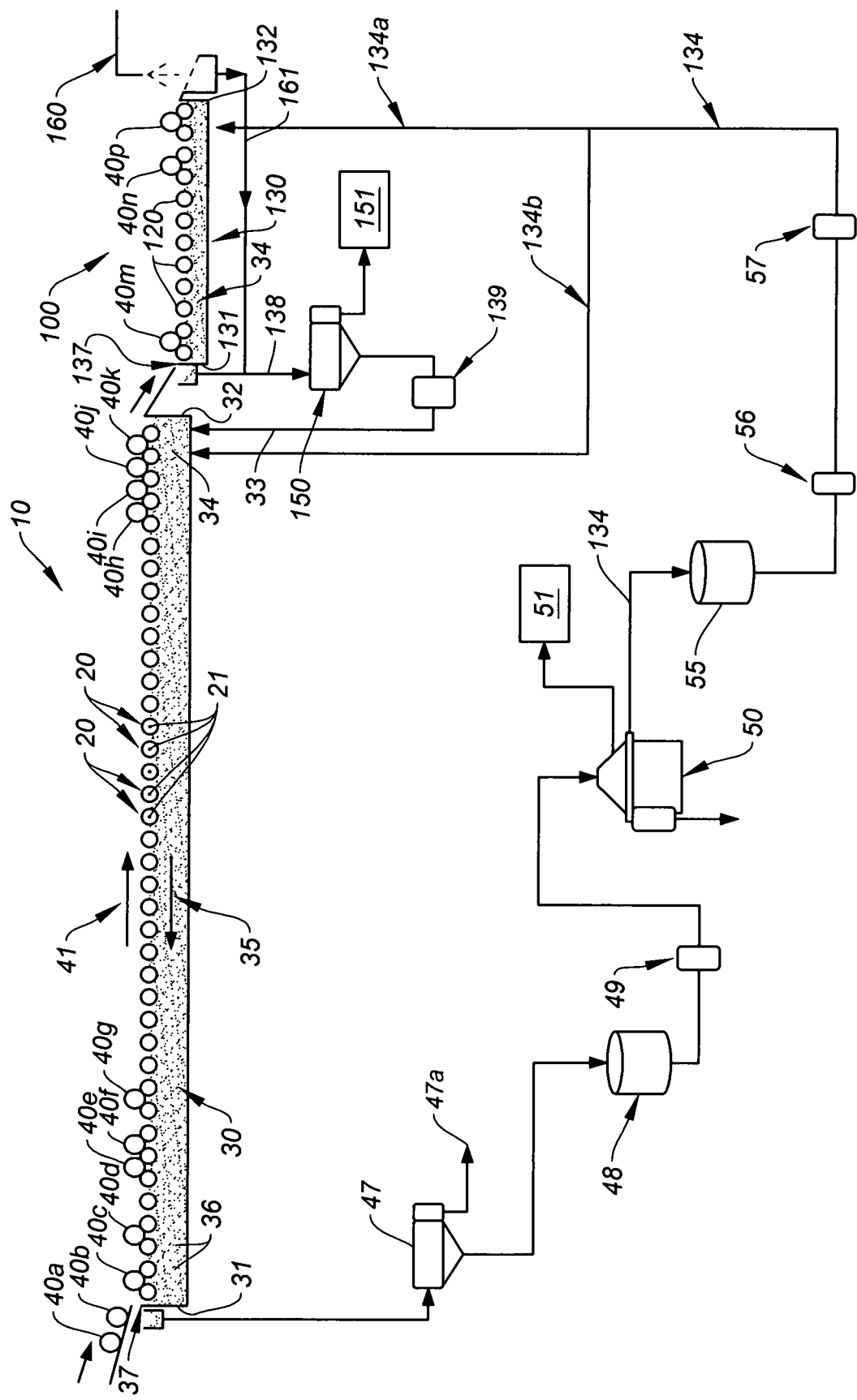
FIG. 3 is a schematic illustration of a second embodiment of the invention.

As shown in FIG. 3, an alternative to the series flow shown in FIG. 1 and described above is to split the flow of liquor 134 into two flowpaths 134*a* and 134*b*, which is referred to as parallel flow. Flowpath 134*a* enters second pan 130 and flowpath 134*b* enters first pan 30. In general series flow is preferred over parallel flow for the sake of reducing centrifuge capacity requirements.

A final spray rinse is quickly applied by nozzle 160 as citrus 40*p* is discharged from rollers 120. Rinse water is collected and transferred to finisher or straining device 150 through line 161.

It is significant to note that the embodiment shown in FIG. 1 utilizes twelve rollers in the second plurality of rollers 120. This number of rollers has a footprint equivalent to the prior art dryer 300 (FIG. 2) allowing this embodiment to be retrofitted to existing equipment. In the case where it is feasible to use a second plurality of rollers with a larger footprint, more than 12 rollers can be utilized.

FIG. 2 represents the closest prior art system 210 known to applicants referred to herein and in the claims as the "closest known prior art." A first plurality of toothed rollers 220 is positioned above pan 230 and transports citrus items 140*a*-140*k* in the direction of arrow 141 from the first end 231 to the second end 232 of pan 230. The toothed rollers penetrate the peels and oil glands of the citrus, causing oil to pass downwardly into pan 230. Water 234 from centrifuge 250 is transferred through line 233 into the second end 232 of pan 230. Water 234 is caused to move in the direction of arrow 235, which is counter to the direction 141 of citrus item 140*a*-140*k*. Water 234 forms an emulsion with oil extracted from the citrus. The emulsion passes over a weir 237 at the first end 231 of pan 230, and is then transferred through intermediary equipment including a paddle finisher 240 (which separates debris 245), buffer tank 241 and positive displacement or centrifugal pump 242 to centrifuge 250. Separated oil is transferred to oil storage 251. The centrifuged water emulsion is transferred to the second end 232 of pan 230 through buffer tank 255 and pump 256 and the process is repeated.

As the citrus reaches the second end 232 of pan 230, a small amount of oil released from oil glands in the peel remains on the exterior surface of the citrus. This oil must be washed off the surface to avoid contaminating the citrus juice which is extracted later. The citrus is transferred by means known is the art from pan 230 to what is referred to in the art as a "dryer" 300. The purpose of dryer 300 is to essentially transfer oil from the outer surface of citrus to a second plurality of smooth rollers 320 by an overhead water spray 324, and then to wipe the oil off the surface of rollers 320 by wiper arms 360. The oil recovered forms an emulsion with water from overhead sprayer 320. That emulsion is transferred to centrifuge 250 and collected at oil storage 251. The dryer 300 does not submerge the citrus in a liquid bath and does not have toothed rollers which penetrate the oil glands in the peel of the citrus.

FIG. 3 is a schematic illustration of a second embodiment of the invention. The only difference between this embodiment and that shown in FIG. 1 is that the middle phase liquor 134 is split into a first portion 134*a* which is transferred to second pan 130 and a second portion 134*b* which is transferred to first pan 30. This embodiment incorporates what we refer to as a "parallel" flow of middle liquor into both pans 30 and 130.

Figure 4:
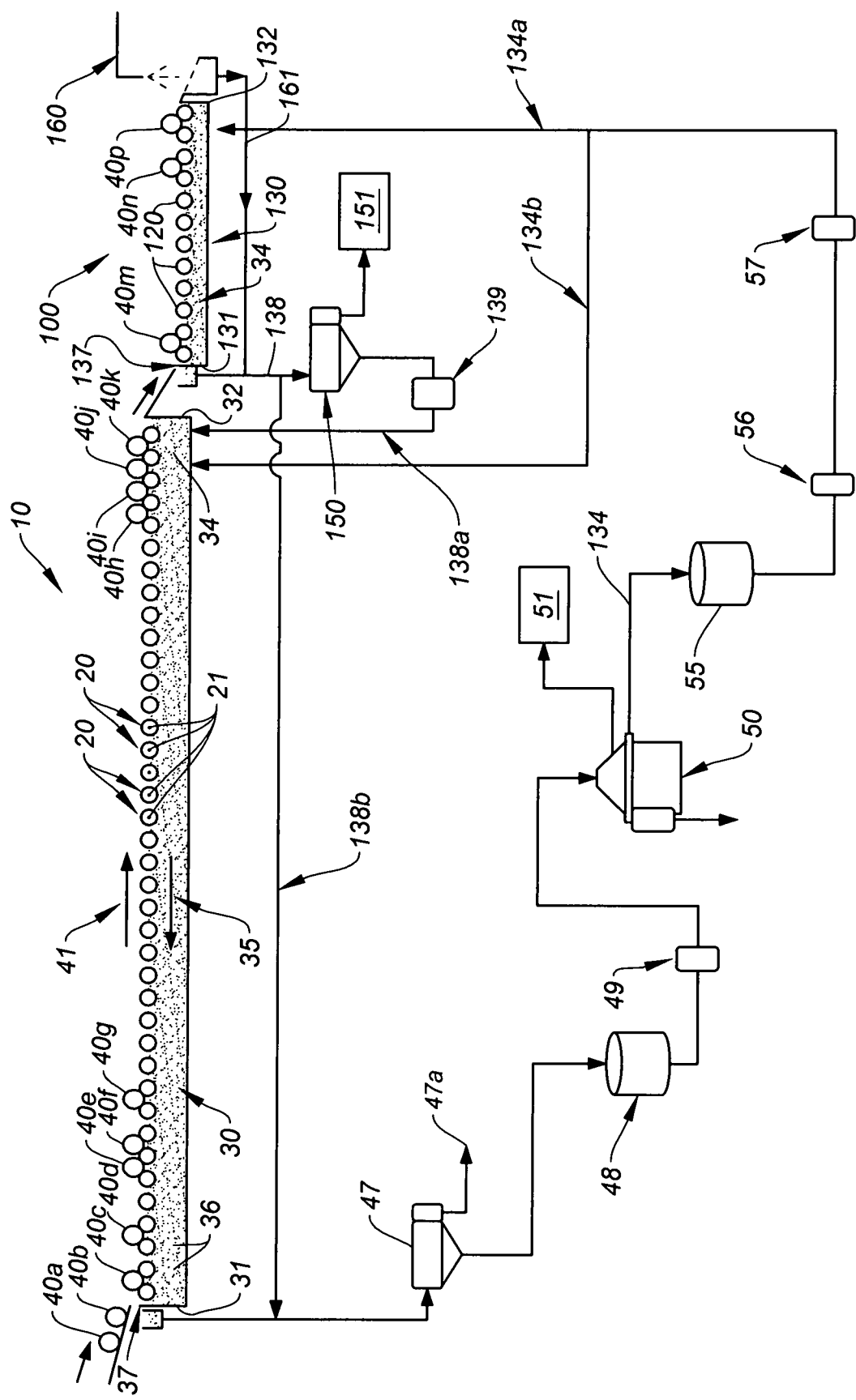
FIG. 4 is a schematic illustration of a third embodiment of the invention.

FIG. 4 is a schematic illustration of a third embodiment of the invention. The only difference between this embodiment and that shown in FIG. 3 is that the water with desorbed oil 138 from second pan 130 is split into a first portion 138*a* which is transferred through separator 150 to first pan 30 and a second portion 138*b* which is transferred through separator 147 to centrifuge 50. This embodiment incorporated what we refer to as a "parallel" flow of not only the middle phase liquor 134, but also of the liquor 138 discharged from second pan 130 which includes the desorbed oil being split into a first portion 138*a* which is transferred to first pan 30 and a second portion 138*b* which is transferred to centrifuge 50.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments suited to the particular use contemplated.

We claim:

1. A two stage apparatus for automatic extraction of oil from the peel of whole citrus fruit, comprising:
   a first stage in which a first plurality of parallel toothed rollers rotate around parallel axes of rotation, each of said first plurality of rollers having a plurality of teeth for penetrating oil glands of the peel of said citrus, first drive means for causing rotation of each of said first plurality of rollers in the same rotational direction to propel said citrus across said first plurality of rollers while penetrating said oil glands, a first water pan positioned below said first plurality of rollers to receive oil passing downwardly from said whole citrus to form an emulsion of water and citrus oil, a centrifuge or other separator for receiving said emulsion and separating oil from said emulsion, forming a middle phase liquor, a second stage in which a second plurality of toothed rollers rotate around parallel axes of rotation, each of said second plurality of rollers having a plurality of teeth for penetrating oil glands in the peel of said citrus, second drive means for causing rotation of each of said second plurality of rollers in the same rotational direction to propel said citrus across said second plurality of rollers while penetrating said oil glands, transfer means for transferring said citrus from said first plurality of rollers to second plurality of rollers, a second water pan positioned relative to said second plurality of rollers so that as citrus is propelled across said second plurality of rollers it is partially submerged in liquor in said water pan, pump means for transferring said middle phase liquor to said second water pan, whereby said citrus on said second plurality of rollers is at least partially submerged in said middle phase liquor to cause desorption of citrus oil into said middle phase liquor, and means for transferring said middle phase liquor with said desorbed citrus oil either into said first water pan, or into said centrifuge or other separator for recovery of oil.

2. The apparatus of claim 1 wherein said middle phase liquor has an oil concentration less than 0.55% by weight.

3. The apparatus of claim 1, wherein said middle phase liquor has an oil concentration less than 0.2% by weight.

4. The apparatus of claim 1, wherein said middle phase liquor flows through said second pan in a direction opposite from the direction of travel of said partially submerged citrus through said second pan.

5. The apparatus of claim 1 wherein the residence time of citrus on said first and second pluralities of rollers is increased by 30% or more, and the oil recovery is increased by at least 4% compared with the closest known prior art system.

6. The apparatus of claim 1 wherein the speed of said first and second pluralities of rollers is increased by 20% and achieves the same percentage of oil extraction compared with the closest known prior art system.

7. The apparatus of claim 1 wherein the residence time of citrus on said first and second pluralities of rollers is increased by less than 30% compared with the closest known prior art system, and wherein the speed of said first and second pluralities of rollers is increased by less than 20% compared with the closest known prior art system, and wherein the oil recovery is increased by less than 4% and throughput capacity is increased by less than 20%.

* * * * *